(12) United States Patent
Oord

(10) Patent No.: US 9,856,086 B2
(45) Date of Patent: Jan. 2, 2018

(54) ROD BELT FOR A ROD BELT CONVEYOR FOR AGRICULTURAL MACHINERY

(71) Applicant: EA BROEKEMA BV Transportbandenfabriek, Veendam (NL)

(72) Inventor: Johan Oord, Groningen (NL)

(73) Assignee: EA BROEKEMA BV Transportbandenfabriek, Veendam (NL)

( * ) Notice: Subject to any disclaimer, the term of this patent is extended or adjusted under 35 U.S.C. 154(b) by 0 days.

(21) Appl. No.: 15/282,721

(22) Filed: Sep. 30, 2016

(65) Prior Publication Data

US 2017/0121118 A1     May 4, 2017

(30) Foreign Application Priority Data

Oct. 1, 2015 (DE) .......................... 10 2015 116 657

(51) Int. Cl.
    *B65G 15/54*     (2006.01)
    *B65G 17/12*     (2006.01)
    *B65G 17/32*     (2006.01)

(52) U.S. Cl.
    CPC .............. *B65G 17/12* (2013.01); *B65G 17/32* (2013.01)

(58) Field of Classification Search
    CPC ............................ B65G 17/06; B65G 17/063

(Continued)

(56) References Cited

U.S. PATENT DOCUMENTS

| 705,528 A | 7/1902 | Heineke |
| 4,653,632 A * | 3/1987 | Timmer ................. A01D 17/10 198/822 |

(Continued)

FOREIGN PATENT DOCUMENTS

| BE | 902 370 A2 | 9/1985 |
| DE | 18 34 273 U | 7/1961 |

(Continued)

OTHER PUBLICATIONS

German Office Action in German application No. 10 2015 116 657.7, filed Oct. 1, 2015, Office Action dated Jun. 15, 2016 (6 pages).

(Continued)

*Primary Examiner* — James R Bidwell
(74) *Attorney, Agent, or Firm* — Shlesinger, Arkwright & Garvey LLP

(57) ABSTRACT

A rod belt for rod belt conveyors of agricultural machinery, having rods situated transversely with respect to the running direction and in parallel to one another, the rods having flattened, perforated fastening areas with which they rest on tensile stress-resistant, continuous elastic belts revolving in parallel to one another, and are connected to the belts by rivets or similar fasteners which pass through the fastening areas and the belts. Thus, a rod belt is provided for rod belt conveying, which allows fastening of functional elements while avoiding the disadvantages stated for the prior art. This is achieved in that in the installed state of the rods, the fastening areas protrude beyond the inner edges of the belts with an overhang area, and have at least one hole in the overhang area for fastening a functional element of the rod belt.

2 Claims, 3 Drawing Sheets

(58) Field of Classification Search
 USPC .......................................................... 198/848
 See application file for complete search history.

(56) References Cited

U.S. PATENT DOCUMENTS

| | | | | |
|---|---|---|---|---|
| 4,799,415 | A * | 1/1989 | Gerdes | B26D 7/20 198/848 |
| 5,692,598 | A | 12/1997 | Röhrs | |
| 6,237,754 | B1 * | 5/2001 | Tjabringa | B65G 15/52 198/803.14 |
| 7,182,202 | B2 * | 2/2007 | Kalverkamp | B65G 17/02 198/698 |
| 9,033,139 | B2 * | 5/2015 | Jager | B65G 15/48 198/850 |
| 2004/0195079 | A1 * | 10/2004 | Webster | B65G 15/52 198/844.2 |
| 2005/0109000 | A1 * | 5/2005 | Mulder | A01D 17/10 56/16.4 R |
| 2015/0141098 | A1 | 5/2015 | Mulder | |

FOREIGN PATENT DOCUMENTS

| | | |
|---|---|---|
| DE | 44 43 163 A1 | 4/1995 |
| DE | 295 17 673 U1 | 1/1996 |
| DE | 296 08 628 U1 | 8/1996 |
| DE | 195 20 927 A1 | 12/1996 |
| EP | 1 977 984 A1 | 10/2008 |
| NL | 2 012 826 C | 11/2014 |
| WO | WO 2013/174370 A1 | 11/2013 |

OTHER PUBLICATIONS

Further search report, dated Mar. 6, 2017, in applicant's counterpart application EP 16191254, dated Mar. 3, 2017 (7 pages).

* cited by examiner

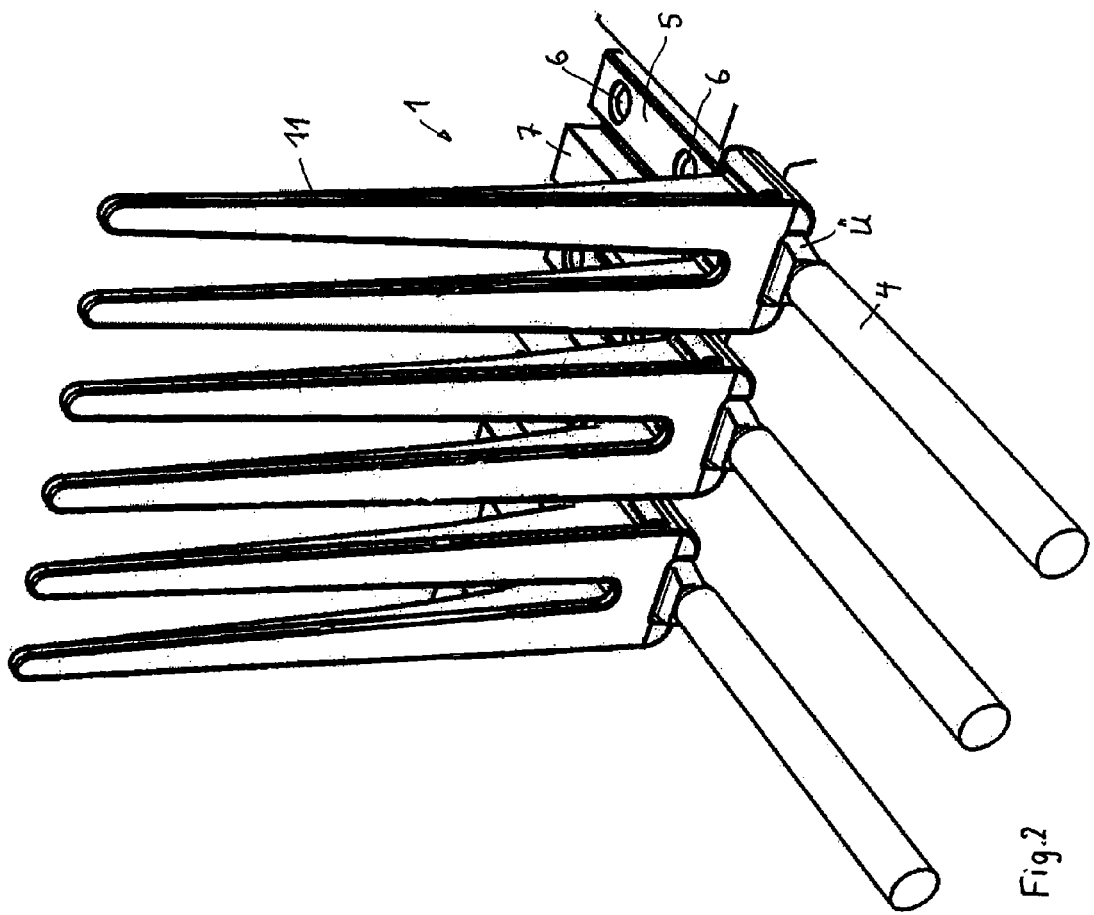
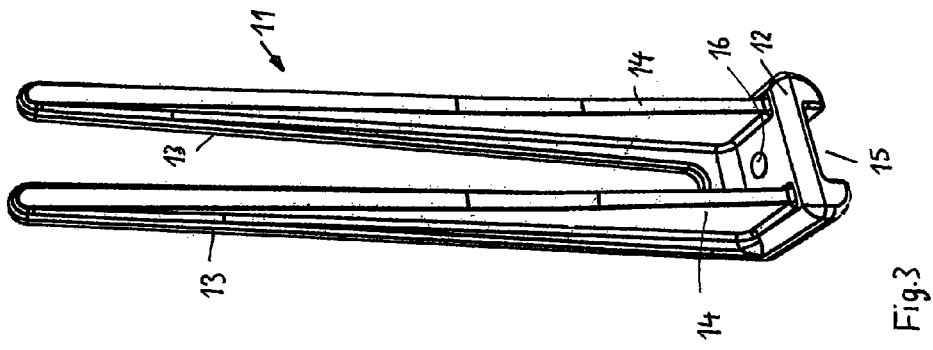

ROD BELT FOR A ROD BELT CONVEYOR FOR AGRICULTURAL MACHINERY

CROSS-REFERENCE TO RELATED APPLICATIONS

This application claims the priority of German Application No. 10 2015 116 657.7, filed Oct. 1, 2015, which is incorporated herein by reference.

FIELD OF THE INVENTION

The present invention relates to a rod belt for a rod belt conveyor for agricultural machinery.

BACKGROUND OF THE INVENTION

Rod belts of this type, as described in DE 18 34 273 U, DE 295 17 673 U1, DE 296 08 628 U1, and DE 195 20 927 A1, for example, have been part of the prior art for quite some time. In these rod belts, the length of the fastening areas of the rods essentially corresponds to the width of the belts, whereby the fastening areas do not protrude, or do not protrude significantly, beyond the edges of the belts when the rods are installed. The rods are fastened to the belts by rivets or similar fastening means. For this purpose, for the fastening means corresponding holes are provided in the fastening areas of the rods, which are aligned with holes in the belts.

U.S. Pat. No. 705,528 A discloses a rod belt conveyor in which the rods are not directly connected to the belts, but instead are fastened to clips which have one or two thin tabs that are riveted to the belts, with protective strips made of flexible material inserted in between. The protective strips, which are wider than the tabs, are intended to prevent the metal of the tabs from damaging the belts when they pass over deflection rollers. The clips also have a fastening area for the rods which adjoins the tabs and protrudes beyond the inner edge of the belts.

It is known to provide the rod belts with further functional elements in addition to the rods. Thus, lateral delimiting fingers are described in EP 1 977 984 A1, which are intended to prevent conveyed material from falling from the rod belt conveyor. These delimiting fingers are directly connected to the belts. For this purpose, the delimiting fingers have support tabs which are placed on the belts from above and riveted thereto. This requires that the belts be provided with additional fastening holes. This is disadvantageous, since the additional fastening holes represent a weakening of the belts.

To avoid this disadvantage, it is known to make use of the fastening points of the rods, which are necessary anyway, for fastening the additional functional elements. Additional fastening holes in the belts may thus be avoided. However, this type of fastening may be used only when approximately equal fastening forces are required for the rods and for the additional functional elements. Greatly different fastening forces would result in one of the elements being fastened too tightly or too loosely to the belts. This is also particularly disadvantageous when the outer side of the belt must travel over idler rollers when the conveyor belt is returning.

OBJECTS AND SUMMARY OF THE INVENTION

An object of the present invention is to provide a rod belt of this type for rod belt conveying, which allows fastening of functional elements while avoiding the disadvantages mentioned above.

This object is achieved according to the invention with a rod belt for rod belt conveyors which has the features of claim 1 and claim 2.

In the present invention, the flattened fastening areas of the rods, which are necessary anyway, are utilized for providing an additional fastening site for functional elements of the rod belt. For this purpose, the fastening areas are extended beyond the customary dimension, which corresponds approximately to the width of the belts, so that in the installed state of the rods, the fastening areas protrude beyond the inner side of the belts with an overhang area. At least one hole is provided in the transition area for fastening a functional element. A robust fastening site for additional functional elements of the rod belt is thus provided which is independent of the fastening points of the rods, and via which additional weakening of the belts is avoided.

Relative terms such as left, right, up, and down are for convenience only and are not intended to be limiting.

BRIEF DESCRIPTION OF THE DRAWINGS

The invention is explained in greater detail below with reference to embodiments. The associated drawings show the following:

FIG. 2 shows an illustration according to FIG. 1 with mounted lateral delimiting fingers, FIG. 3 shows a perspective view of a lateral delimiting finger.

DETAILED DESCRIPTION OF THE INVENTION

Figure 1:
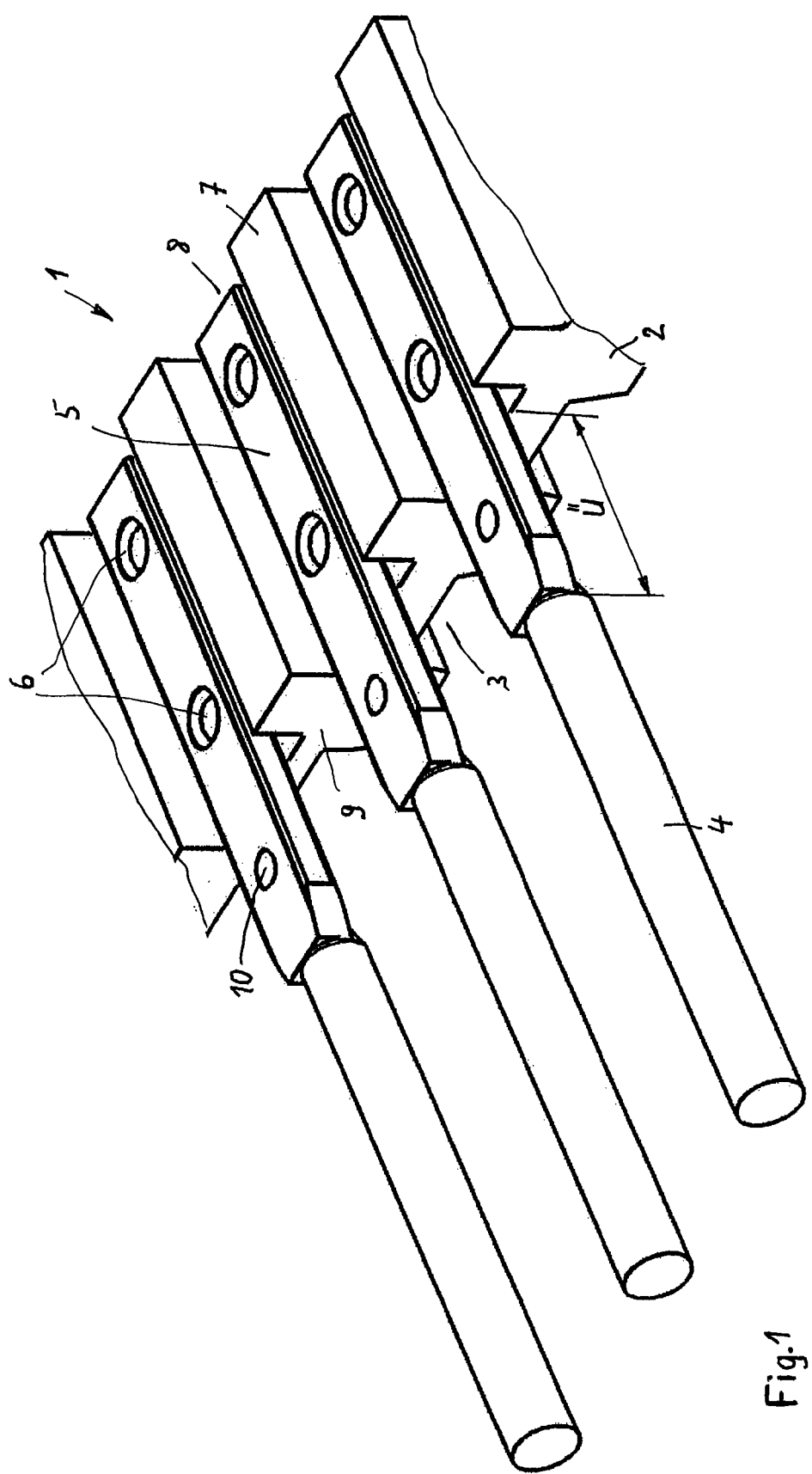
FIG. 1 shows a perspective view of the fastening areas of rods of a rod belt on a belt.

A rod belt for rod belt conveyors for agricultural machinery is made up of at least two revolving belts 1 situated in parallel with respect to one another. Only a portion of one side of the rod belt is illustrated in the drawings. The other side has a mirror-image design, so that the following statements also apply for this side.

In this embodiment, the belts 1 are designed as cam belts, and may be made, for example, of rubber reinforced with fabric inserts. Cams 2 which are spaced apart from one another at predefined intervals are provided on the bottom side of the belt 1. These cams 2 are used for the positive drive of the rod belt. For this purpose, a drive means, not illustrated, of drive wheels engages with gaps 3 situated between the cams 2. Such designs are well known from the prior art, and therefore require no further detailed explanation.

The distance between the belts 1 of the rod belt is provided by rods 4 which are situated transversely with respect to the conveying direction of the rod belt and in parallel to one another, and which at their ends are connected to the belts 1. For this purpose, the rods 4 are provided with flattened fastening areas 5 which are produced by forging from circular rods, for example, and which rest on the belts 1. The fastening areas 5 have two spaced-apart holes 6 which are aligned with holes, not visible in the drawings, in the belts 1. The rods 4 are fastened to the belts 1 by rivets, for example (not illustrated), which pass through the holes 6 in the fastening areas 5 and the holes, aligned with same, in the belts 1.

The belts 1 are provided with profiling on their top side which is made up of free-standing ribs 7, between which a recess 8 is formed. This recess 8 is used for the countersunk accommodation of the flattened fastening areas 5 of the rods 4.

As is most clearly apparent from FIG. 1, the fastening areas 5 of the rods 4 are extended beyond their customary length, which corresponds approximately to the width of the belt 1. When the rods 4 are mounted, this results in an overhang area Ü with which the fastening area 5 protrudes beyond the inner edge 9 of the belt 1. A first fastening hole 10 for an additional functional element of the rod belt is provided in the overhang area Ü.

In the embodiment according to FIGS. 2 and 3, lateral delimiting fingers 11 as additional functional elements are integrated into the rod belt. The lateral delimiting fingers 11 are manufactured as injection-molded parts made of plastic. They have a base 12 from which two prongs 13 protrude in a fork-like manner. The prongs 13 are reinforced by webs 14. The base 12 has a receiving groove 15 and a second fastening hole 16. For mounting, the lateral delimiting fingers 11 with their receiving grooves 15 are pushed onto the overhang areas Ü, and the fastening holes 16 and 10 of the base 12 and the overhang area Ü, respectively, are brought into alignment with one another. The lateral delimiting fingers 11 may then be connected to the overhang areas Ü by riveting, for example.

Figure 4:
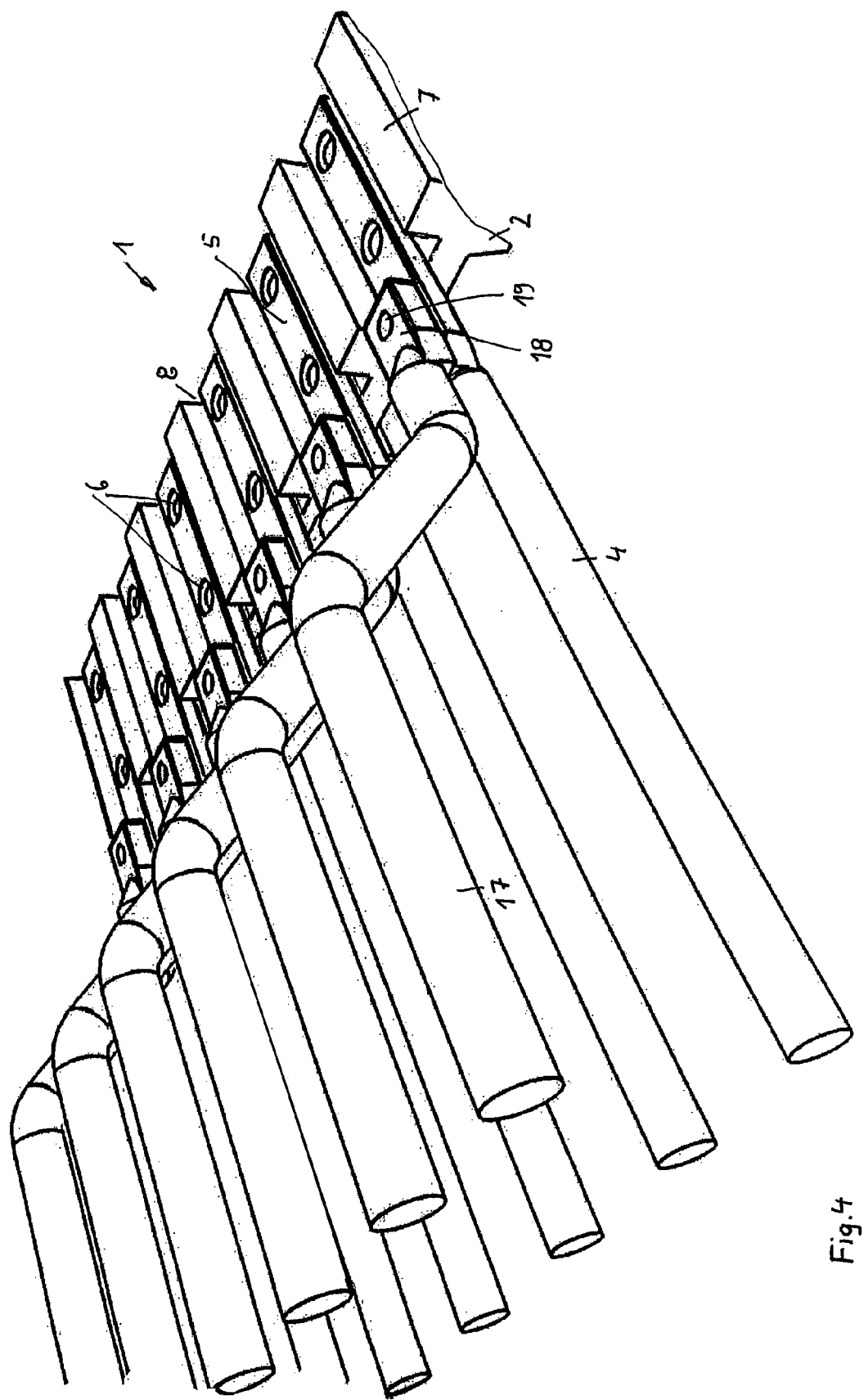
FIG. 4 shows an illustration according to FIG. 1 with mounted entrainment bars.

In the embodiment according to FIG. 4, an entrainment bar 17 as an additional functional element is integrated into the rod belt. The entrainment bars 17 have a flattened area 18 with a fastening hole 19 at their ends. For fastening the entrainment bars 17, their flattened areas 18 are placed on the overhang area Ü, and the fastening holes 19 and 10 are brought into alignment. The fastening may then take place by riveting, for example.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. A rod belt for rod belt conveyors of agricultural machinery, and having rods situated transversely with respect to the running direction and in parallel to one another, the rods having flattened, perforated fastening areas with which they rest on tensile stress-resistant, continuous elastic belts revolving in parallel to one another, and are connected to the belts by rivets which pass through the fastening areas and the belts, and in the installed state of the rods, the fastening areas protrude beyond the inner edges of the belts with an overhang area, and have a first fastening hole in the overhang area for fastening a functional element of the rod belt; lateral delimiting fingers are provided as an additional functional element integrated into the rod belt; the lateral delimiting fingers are plastic; the lateral delimiting fingers have a respective base from which two prongs protrude, the two prongs are reinforced by respective webs; the base has a receiving groove and a second fastening hole; the lateral delimiting fingers are mounted on the rod belt by their respective receiving grooves on the overhang areas, and the respective first and second fastening holes of the base and the overhang area are aligned; and lateral delimiting fingers are connected to the overhang areas by the rivets.

2. A rod belt for rod belt conveyors of agricultural machinery, the rod belt comprising:
   a) rods situated transversely with respect to the running direction and in parallel to one another, the rods having flattened, perforated fastening areas with which they rest on tensile stress-resistant, continuous elastic belts revolving in parallel to one another, and are connected to the belts by rivets which pass through the fastening areas and the belts, and in the installed state of the rods, the fastening areas protrude beyond the inner edges of the belts with an overhang area, and have a first fastening hole in the overhang area for fastening a functional element of the rod belt;
   b) lateral delimiting fingers being provided as an additional functional element in the rod belt, the lateral delimiting fingers being plastic; the lateral delimiting fingers having a respective base from which two prongs protrude, the two prongs being reinforced by respective webs; and
   c) the base having a receiving groove and a second fastening hole; the lateral delimiting fingers being mounted on the rod belt by their respective receiving grooves on the overhang areas, and by the respective first and second fastening holes and lateral delimiting fingers being connected by the rivets.

* * * * *